(12) United States Patent
Mukai et al.

(10) Patent No.: US 11,287,335 B2
(45) Date of Patent: Mar. 29, 2022

(54) FORCE SENSOR FOR DETECTING A COMPONENT OF A FORCE EXERTED ON A STRAIN ELEMENT IN A SPECIFIC DIRECTION

(71) Applicant: SINTOKOGIO, LTD., Nagoya (JP)

(72) Inventors: Suguru Mukai, Nagano (JP); Natsuki Yui, Nagano (JP); Hiroyasu Makino, Aichi (JP); Takumi Kobayashi, Aichi (JP)

(73) Assignee: SINTOKOGIO, LTD., Aichi (JP)

( * ) Notice: Subject to any disclaimer, the term of this patent is extended or adjusted under 35 U.S.C. 154(b) by 6 days.

(21) Appl. No.: 16/826,721

(22) Filed: Mar. 23, 2020

(65) Prior Publication Data

US 2020/0309617 A1 Oct. 1, 2020

(30) Foreign Application Priority Data

Mar. 29, 2019 (JP) .............................. JP2019-068599

(51) Int. Cl.
*G01L 1/22* (2006.01)
*G01L 3/00* (2006.01)

(52) U.S. Cl.
CPC .............. *G01L 1/2262* (2013.01); *G01L 3/00* (2013.01)

(58) Field of Classification Search
CPC ....... G01L 1/2262; G01L 3/00; G01L 5/1627; G01L 1/22

USPC ..................................................... 73/862.628
See application file for complete search history.

(56) References Cited

U.S. PATENT DOCUMENTS

| 5,035,148 | A | * | 7/1991 | Okada | G01L 5/162 |
| | | | | | 73/862.044 |
| 8,250,934 | B2 | * | 8/2012 | Sakurai | G01L 5/1627 |
| | | | | | 73/862.044 |
| 9,448,128 | B2 | * | 9/2016 | Kim | G01L 5/1627 |
| 2013/0340537 | A1 | * | 12/2013 | Freiwald | G01L 5/161 |
| | | | | | 73/862.045 |
| 2017/0205296 | A1 | * | 7/2017 | Bradford | G01L 1/22 |
| 2019/0226929 | A1 | * | 7/2019 | Suzuki | G01L 3/108 |
| 2020/0309626 | A1 | * | 10/2020 | Mukai | G01L 5/10 |

FOREIGN PATENT DOCUMENTS

JP 6047703 B2 * 12/2016
JP 2018-146309 A 9/2018

\* cited by examiner

*Primary Examiner* — Octavia Hollington
(74) *Attorney, Agent, or Firm* — Harness, Dickey & Pierce, P.L.C.

(57) ABSTRACT

The present invention improves the reliability of a force sensor in terms of mechanical troubles. The force sensor includes: a primary bridge circuit that includes a first strain gauge group disposed on a first main face of a strain element and that is configured to detect a component, in a specific direction, of a force exerted on a strain element; and a secondary bridge circuit that includes a second strain gauge group disposed on a second main face of the strain element and that is configured to detect a component of a force in the same direction as the specific direction.

7 Claims, 6 Drawing Sheets

FORCE SENSOR FOR DETECTING A COMPONENT OF A FORCE EXERTED ON A STRAIN ELEMENT IN A SPECIFIC DIRECTION

This Nonprovisional application claims priority under 35 U.S.C. § 119 on Patent Application No. 2019-068599 filed in Japan on Mar. 29, 2019, the entire contents of which are hereby incorporated by reference.

TECHNICAL FIELD

The present invention relates to a force sensor.

BACKGROUND ART

Force-torque sensors are used in various industrial fields. Such a force-torque sensor detects forces in specific directions with use of bridge circuits each including a certain combination of strain gauges. The strain gauges detect strain in a strain element caused by the force applied to the strain element. The strain element includes, for example: a core portion that receives a force; a frame portion fixed to the core portion; arm portions that connect the core portion and the frame portion; and flexures residing between the frame portion and the arm portions. For example, Patent Literature 1 discloses a six-axis force-torque sensor which has six sets of strain gauges disposed on one of the two opposite main faces.

CITATION LIST

Patent Literature

[Patent Literature 1]
Japanese Patent Application Publication Tokukai No. 2018-146309

SUMMARY OF INVENTION

Technical Problem

However, according to the six-axis force-torque sensor disclosed in Patent Literature 1, if failure occurs in one of the strain gauges, the bridge circuit that includes the strain gauge with the failure becomes incapable of detecting forces correctly. Furthermore, since the six-axis force-torque sensor as described above detects forces in six different directions using respective different bridge circuits, it is difficult to determine that there is failure in the force-torque sensor by comparing the values of forces detected by such different bridge circuits.

An object of an aspect of the present invention is to improve the reliability of a force sensor in terms of mechanical troubles.

Solution to Problem

In order to attain the above object, a force sensor in accordance with an aspect of the present invention is a force sensor for detecting a component, in a specific direction, of a force exerted on a strain element, the force sensor including: a primary bridge circuit that includes a first strain gauge group disposed on a first face of the strain element and that is configured to detect a component, in the specific direction, of a force exerted on the strain element; and a secondary bridge circuit that includes a second strain gauge group disposed on a second face of the strain element and that is configured to detect a component, in the same direction as the specific direction, of the force exerted on the strain element, the second face being opposite the first face.

Advantageous Effects of Invention

According to an aspect of the present invention, it is possible to improve the reliability of a force sensor in terms of mechanical troubles.

DESCRIPTION OF EMBODIMENTS

Embodiment 1

The following description will discuss a force-torque sensor 10 (an example of force sensor of the present invention) in accordance with Embodiment 1, with reference to FIGS. 1 to 4. The force-torque sensor 10 is a force-torque sensor that detects components, in specific directions, of a force exerted on a sprint element. The specific directions are, assuming three orthogonal x, y, and z axes, the following six directions (hereinafter also referred to as "six-axis directions"): a direction along the x axis; a direction along the y axis; a direction along the z axis; a direction of rotation about the x axis; a direction of rotation about the y axis; and a direction of rotation about the z axis. The components in the specific directions are represented by Fx, Fy, Fz, Mx, My, and Mz. Fx represents an x-direction component of a force exerted on the strain element. Fy represents a y-direction component of the force. Fz represents a z-direction component of the force. Mx represents a moment component, about the x axis, of the force. My represents a moment component, about the y axis, of the force. Mz represents a moment component, about the z axis, of the force.

Figure 1:
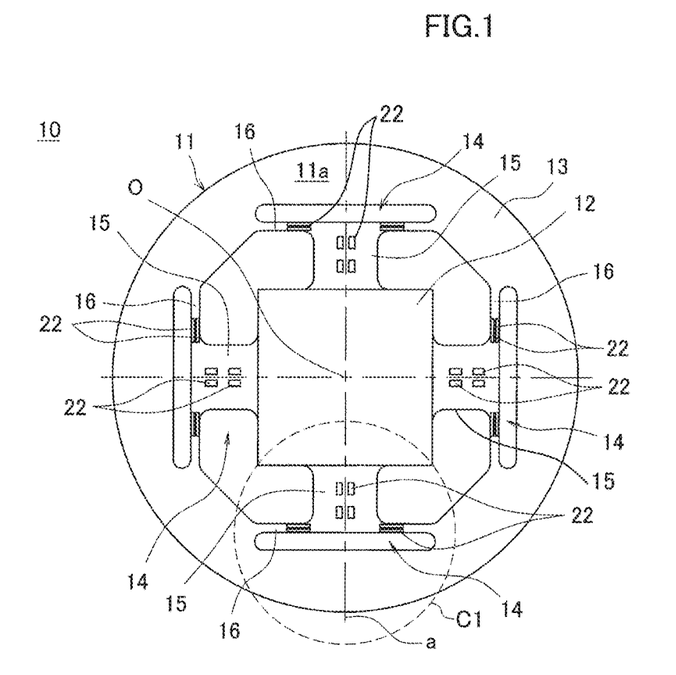
FIG. 1 is a plan view schematically illustrating a configuration of a first main face of a force-torque sensor in accordance with an embodiment of the present invention.
Figure 2:
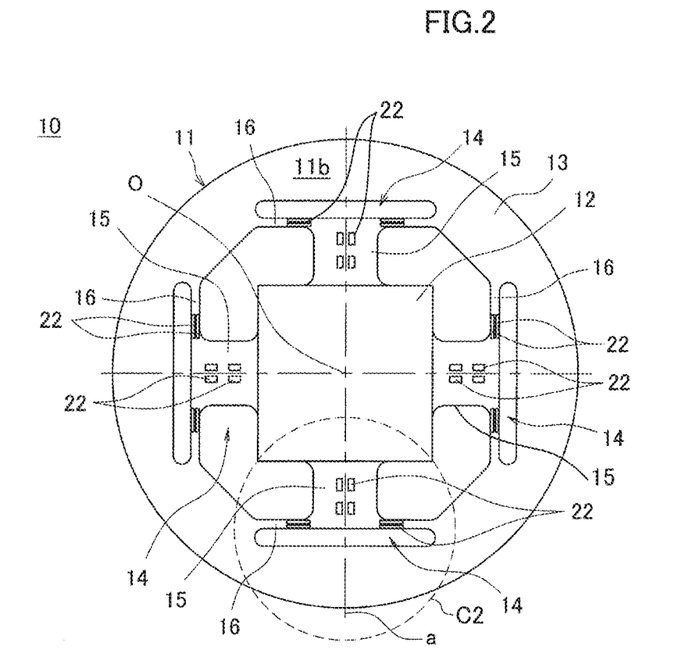
FIG. 2 is a plan view schematically illustrating a configuration of a second main face of the force-torque sensor in accordance with the embodiment of the present invention.
Figure 3:
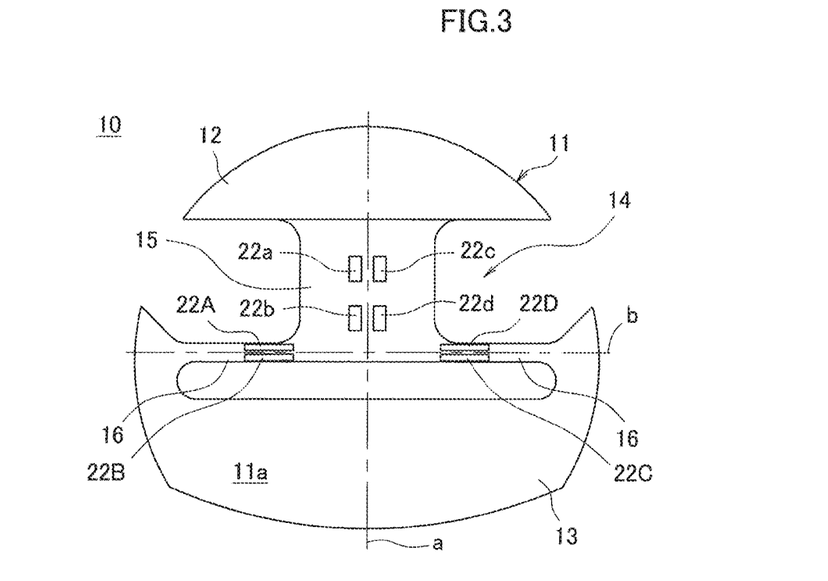
FIG. 3 is an enlarged view of an area enclosed by circle C1 of FIG. 1, and schematically illustrates a first example arrangement of strain gauges on a first main face of a beam portion.
Figure 4:
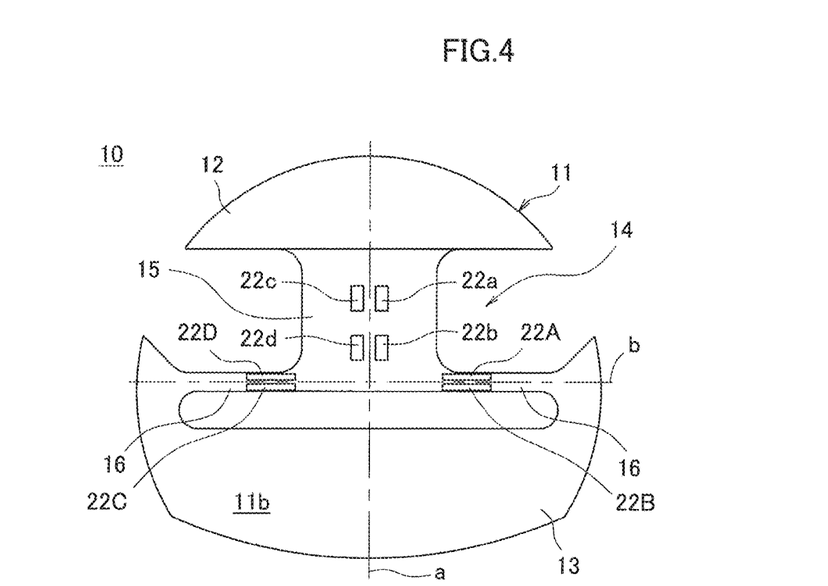
FIG. 4 is an enlarged view of an area enclosed by circle C2 of FIG. 2, and schematically illustrates a first example arrangement of strain gauges on a second main face of the beam portion.

FIG. 1 is a plan view schematically illustrating a configuration of a first main face of a force-torque sensor in accordance with an embodiment of the present invention. FIG. 2 is a plan view schematically illustrating a configuration of a second main face of the force-torque sensor in accordance with the embodiment of the present invention. FIG. 3 is an enlarged view of an area enclosed by circle C1 of FIG. 1, and schematically illustrates a first example arrangement of strain gauges on a first main face of a beam portion. FIG. 4 is an enlarged view of an area enclosed by circle C2 of FIG. 2, and schematically illustrates a first example arrangement of strain gauges on a second main face of the beam portion.

Note that, for the purpose of processing (e.g., carrying out matrix operation or the like on) output signals from bridge circuits (described later), the force-torque sensor 10 includes a processing section (not illustrated) that includes: a central processing unit (CPU); and a storage section such as a read only memory (ROM) and/or a random access memory (RAM).

[Strain Element]

The force-torque sensor 10 includes a strain element 11. More specifically, the strain element 11 has, for example, a circular profile (or some other shape such as a quadrangle or a polygon), and has a first main face (first face) 11a, a second main face (second face) 11b opposite the first main face 11a, and an outer peripheral face. In Embodiment 1, a direction along the x axis and a direction along the y axis are mutually orthogonal directions, for example. The first main face and the second main face are each parallel to the x-y plane. A direction along the z axis is orthogonal to the x-y plane.

In Embodiment 1, the strain element 11 includes: a core portion 12 located at the center; a frame portion 13 that extends around the core portion 12 and that serves as a rim portion; and beam portions 14 which connect the core portion 12 and the frame portion 13.

The core portion 12 in Embodiment 1 serves to receive a force to be detected, and is also referred to as a force receiver. The frame portion 13 in Embodiment 1 serves to fix the position of the core portion 12 relative to an object to which the force-torque sensor 10 is attached, and is also referred to as a fixing portion. The core portion 12 and the frame portion 13 can each serve as a force receiver or a fixing portion.

There is no limitation on the shape of the core portion 12. In Embodiment 1, the core portion 12 is in the shape of a prism with a substantially square base (i.e., substantially in the shape of a quadratic prism). There is no limitation on the shape of the frame portion 13, as well. In Embodiment 1, the frame portion 13 is in the shape of a tube with a substantially circular base having a substantially square opening.

The beam portions 14 each extend radially from the core portion 12 toward the frame portion 13. There is no limitation on the number of beam portions 14. In Embodiment 1, the number of beam portions 14 is four. More specifically, the four beam portions 14 are arranged in the form of a cross (in the form of a letter X) in plan view and are arranged along a circumferential direction of the core portion 12 and the frame portion 13 so as to be equally spaced apart from each other (spaced apart from each other by 90° around the center O).

Each of the beam portions 14 includes an arm portion 15 and a flexure 16. The arm portion 15 extends radially from the core portion 12 toward the frame portion 13. There is a gap between an end of the arm portion 15 and the frame portion 13, and the flexure 16 resides between the end of the arm portion 15 and the frame portion 13. The flexure 16 extends in a direction intersecting the direction of extension of the arm portion 15, and is connected to the frame portion 13. As such, each of the beam portions 14 has a structure in which the flexure 16 resides between the frame portion 13 and the arm portion 15. The strain element 11 is configured such that, when the core portion 12 and the frame portion 13 are considered rigid bodies, the beam portions 14 can be considered elastic bodies.

The strain element 11 can be obtained by, for example, making through-holes or the like in a material with a spring property such as an aluminum alloy, alloy steel, or stainless steel with use of a numerical controlled (NC) machine. This method results in the formation of spaces (openings) in the strain element 11, by which the core portion 12, the frame portion 13, and the beam portions 14 are partitioned.

When an external force is applied to the core portion 12, stress (strain such as bending, shearing, twisting) occurs in one or more of the beam portions 14. For example, bending (flection) occurs in the direction of extension of a beam portion 14 and in a direction orthogonal to the direction of extension of the beam portion 14, shearing occurs in a direction at an angle of 45° to the direction of extension of the beam portion 14, and twisting occurs in a direction of rotation about the beam portion 14.

[Strain Gauge]

The force-torque sensor 10 includes a first strain gauge group provided on the first main face 11a of the strain element 11. The first strain gauge group is constituted by a plurality of strain gauges 22.

Each of the strain gauges 22 is constituted by, for example, (i) a conductive pattern constituted by a thin metal film (metal foil) made of a copper(Cu)-nickel(Ni)-based alloy or a Ni-chromium(Cr)-based alloy and (ii) a film made of flexible resin, such as a polyimide resin or an epoxy resin, which covers the pattern. Such a strain gauge is bonded to one of the beam portions 14 with an adhesive. When the thin metal film deforms due to strain in the beam portion 14, the thin metal film changes resistance, based on which the strain is sensed and detected. There is no limitation on the strain gauges 22, provided that the strain gauges 22 are capable of detecting different kinds of strain (such as bending, shearing) separately. Therefore, the strain gauges 22 may be semiconductor strain gauges comprised of a thin semiconductor film, instead of the thin metal film.

A sputtering method or a vacuum evaporation method can be used to directly form thin metal film gauges on first main faces (which are part of the first main face 11a) of the beam portions 14. This makes it possible to place the strain gauges 22 on the beam portions 14 without using an adhesive. This is advantageous, because this prevents or reduces misalignment of the strain gauges 22 during placement of the strain gauges 22 and sufficiently improves the accuracy of detection of components of a force in the strain element 11.

The first strain gauge group includes eight strain gauges 22 per beam portion 14. Hereinafter, the reference number "22" of each strain gauge may be assigned an alphabetical letter at the end thereof for the purpose of indicating a specific location.

As illustrated in FIG. 3, one beam portion 14 has four strain gauges 22a, 22b, 22c, and 22d provided on its arm portion 15, and has four strain gauges 22A, 22B, 22C, and 22D provided on its flexure 16.

At the arm portion 15, the strain gauge 22a and the strain gauge 22c are arranged symmetrically to each other with respect to centerline a of the beam portion 14, and the strain gauge 22b and the strain gauge 22d are arranged symmetrically to each other with respect to the centerline a. The strain gauge 22a and the strain gauge 22b are arranged in parallel to the centerline a, and the strain gauge 22c and the strain gauge 22d are arranged in parallel to the centerline a.

At the flexure 16, the strain gauge 22A and the strain gauge 22B are arranged symmetrically to each other with respect to centerline b of the flexure 16, and the strain gauge 22C and the strain gauge 22D are arranged symmetrically to each other with respect to the centerline b. The strain gauge 22A and the strain gauge 22D are arranged in parallel to the centerline b, and the strain gauge 22B and the strain gauge 22C are arranged in parallel to the centerline b.

[Bridge Circuit]

The force-torque sensor 10 includes primary bridge circuits that include the foregoing first strain gauge group and that detect specific directional components of a force exerted on the strain element 11.

More specifically, the force-torque sensor 10 includes a first bridge circuit group that detects a force component Fz in a direction along the z axis, a moment component Mx about the x axis, and a moment component My about the y axis.

The first bridge circuit group is a group of FzMxMy bridge circuits each including four strain gauges 22a, 22b, 22c, and 22d disposed on a first main face (which is part of the first main face 11a) of an arm portion 15. Each arm portion 15 is provided with one FzMxMy bridge circuit. That is, the first bridge circuit group is constituted by four such FzMxMy bridge circuits.

The FzMxMy bridge circuits are first bridge circuits that detect a force component Fz in a direction along the z axis, a moment component Mx about the x axis, and a moment component My about the y axis. Each of the FzMxMy bridge circuits is configured such that a series circuit composed of the strain gauges 22a and 22b and a series circuit composed of the strain gauges 22c and 22d are connected in parallel to an output of the bridge circuit.

The strain gauges 22a, 22b, 22c, and 22d of each FzMxMy bridge circuit change resistance in response to the strains they detect. When the FzMxMy bridge circuit reaches a non-equilibrium state, a change occurs in an output signal Vo from the FzMxMy bridge circuit. Each of the components Fz, Mx, and My is detected based on a combination of output signals from the four FzMxMy bridge circuits disposed on the first main faces (which are part of the first main face 11a) of the beam portions 14.

The force-torque sensor 10 includes a second bridge circuit group that detects a force component Fx in a direction along the x axis, a force component Fy in a direction along the y axis, and a moment component Mz about the z axis.

The second bridge circuit group is a group of FxFyMz bridge circuits each including four strain gauges 22A, 22B, 22C, and 22D disposed on a first main face (which is part of the first main face 11a) of a flexure 16. Each flexure 16 is provided with one FxFyMz bridge circuit. That is, the second bridge circuit group is constituted by four such FxFyMz bridge circuits.

The FxFyMz bridge circuits are second bridge circuits that detect a force component Fx in a direction along the x axis, a force component Fy in a direction along the y axis, and a moment component Mz about the z axis. Each of the FxFyMz bridge circuits is configured such that a series circuit composed of the strain gauges 22A and 22B and a series circuit composed of the strain gauges 22C and 22D are connected in parallel to an output of the bridge circuit.

The strain gauges 22A, 22B, 22C, and 22D of each FxFyMz bridge circuit change resistance in response to the strains they detect. When the FxFyMz bridge circuit reaches a non-equilibrium state, a change occurs in an output signal Vo from the FxFyMz bridge circuit. Each of the components Fx, Fy, and Mz is detected based on a combination of output signals from the four FxFyMz bridge circuits disposed on the first main faces (which are part of the first main face 11a) of the beam portions 14.

In the above manner, the specific direction components Fx, Fy, Fz, Mx, My, and Mz of the force exerted on the strain element 11 are detected from the primary bridge circuits that include the first strain gauge group provided on the first main face 11a of the strain element 11. Each of the primary bridge circuits is a bridge circuit that belongs to the first bridge circuit group or the second bridge circuit group.

[Configuration on Second-Main-Face Side]

The force-torque sensor 10 includes secondary bridge circuits that include a second strain gauge group provided on the second main face 11b and that detect components, in the same directions as the foregoing specific directions, of the force exerted on the strain element 11 (i.e., the components Fx, Fy, Fz, Mx, My, and Mz).

The second strain gauge group is constituted by a plurality of strain gauges 22 disposed on the second main face 11b so as to correspond in location to the strain gauges 22 on the first main face 11a. The force-torque sensor 10 includes a third bridge circuit group that detects a force component Fz in a direction along the z axis, a moment component Mx about the x axis, and a moment component My about the y axis. The third bridge circuit group is a group of FzMxMy bridge circuits each including four strain gauges 22a, 22b, 22c, and 22d disposed on a second main face (which is part of the second main face 11b) of an arm portion 15. Each arm portion 15 is provided with one FzMxMy bridge circuit. That is, the third bridge circuit group is constituted by four such FzMxMy bridge circuits.

The force-torque sensor 10 include a fourth bridge circuit group that detects a force component Fx in a direction along the x axis, a force component Fy in a direction along the y axis, and a moment component Mz about the z axis. The fourth bridge circuit group is a group of FxFyMz bridge circuits each including four strain gauges 22A, 22B, 22C, and 22D disposed on a second main face (which is part of the second main face 11b) of a flexure 16. Each flexure 16 is provided with one FxFyMz bridge circuit. That is, the fourth bridge circuit group is constituted by four such FxFyMz bridge circuits.

The arrangement of strain gauges 22 in each of the FzMxMy bridge circuits of the third bridge circuit group and the arrangement of strain gauges 22 in each of the FxFyMz bridge circuits of the fourth bridge circuit group, on the second main face 11b, are the same as those of strain gauges 22 of the first and second bridge circuit groups on the first main face 11a (see FIGS. 2 and 4).

In this configuration, a change occurs in an output signal from each of the four FzMxMy bridge circuits disposed on the second main faces (which are part of the second main face 11b) of the beam portions 14 in response to the strains detected by the respective strain gauges 22a, 22b, 22c, and 22d disposed on the second main faces. Each of the components Fz, Mx, and My is detected based on a combination of these output signals.

Also, a change occurs in an output signal from each of the four FxFyMz bridge circuits disposed on the second main faces (which are part of the second main face 11b) of the beam portions 14 in response to the strains detected by the respective strain gauges 22A, 22B, 22C, and 22D disposed on the second main faces. Each of the components Fx, Fy, and Mz is detected based on a combination of these output signals.

In the above manner, the components Fx, Fy, Fz, Mx, My and Mz, in the same directions as the foregoing specific directions, of the force exerted on the strain element 11 are detected from the secondary bridge circuits that include the second strain gauge group provided on the second main face 11b of the strain element 11. Each of the secondary bridge circuits is a bridge circuit that belongs to the third bridge circuit group or the fourth bridge circuit group.

As is clear from the above descriptions, the force-torque sensor 10 is configured to detect the components in six-axis directions Fx, Fy, Fz, Mx, My, and Mz of an external force exerted on the core portion 12 from the strain gauges 22 disposed on the first face 11a and the bridge circuits including those strain gauges 22. Furthermore, the force-torque sensor 10 is configured to detect, independently of the foregoing detection of the components of a force at the first main face 11a, the components in six-axis directions Fx, Fy, Fz, Mx, My, and Mz of the external force exerted on the core portion 12 from the strain gauges 22 disposed on the second main face 11b and the bridge circuits including those strain gauges 22.

The force-torque sensor 10 has the above-described configuration, and therefore specific directional components (the foregoing components in six-axis directions) can be detected at each of the first and second main faces independently, with use of a plurality of bridge circuits. Therefore, with use of the components detected by the plurality of bridge circuits, it is possible to improve the reliability of a force-torque sensor in terms of mechanical troubles.

Furthermore, the force-torque sensor 10 includes the flexures 16 of the beam portions 14. This makes it possible to detect components of a force more accurately than force-torque sensors that include a strain element with no such flexures.

[Example of Process of Determining Whether there is Mechanical Trouble]

The force-torque sensor 10 further includes a circuit or a processor that determines whether or not there is a mechanical trouble in the force-torque sensor 10 by comparing components detected by primary bridge circuits and components detected by secondary bridge circuits.

Examples of the mechanical troubles include: plastic deformation of the strain element 11; degradation of strain gauges; detachment of strain gauges; and disconnection in traces or wires of bridge circuits. Whether there is such a mechanical trouble can be determined by, for example, using an appropriate threshold in comparing the components detected by the primary bridge circuits and the components detected by the secondary bridge circuits. The type of mechanical trouble to be subjected to the determination can be set appropriately according to, for example, what threshold is employed. The process of the determination can be carried out by, for example, the foregoing CPU.

Figure 5:
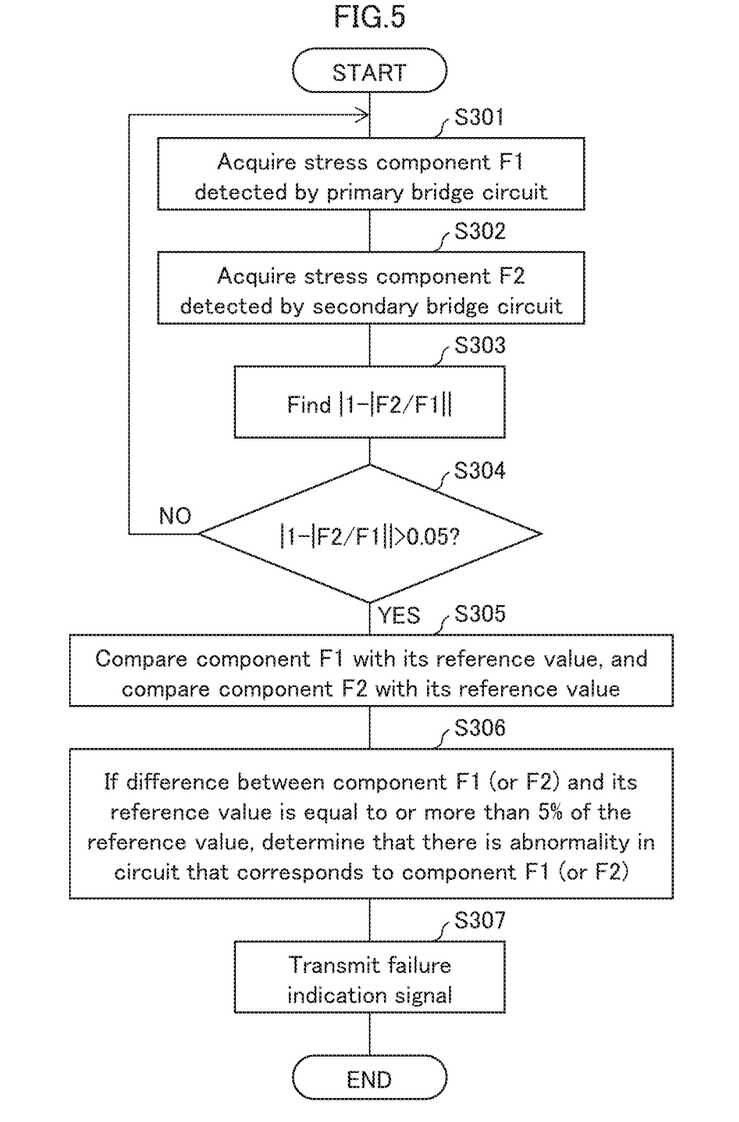
FIG. 5 is a flowchart showing an example of a flow of a process of determining whether there is a mechanical trouble, carried out by a force-torque sensor in accordance with an embodiment of the present invention.

FIG. 5 is a flowchart showing an example of a flow of a process of determining whether there is a mechanical trouble, carried out by a force-torque sensor 10 in accordance with an embodiment of the present invention. In this example, it is assumed that a component of a force detected by a primary bridge circuit is usually used as a component of a force outputted externally from the force-torque sensor 10.

In step S301, the CPU acquires a component F1 of a force detected by a primary bridge circuit.

In step S302, the CPU acquires a component F2 of a force detected by a secondary bridge circuit.

In step S303, the CPU finds the absolute value of the ratio of the difference between F1 and F2 to F1 ($|1-|F2/F1||$).

In a case where there is a mechanical trouble such as plastic deformation of the strain element 11 in the force-torque sensor 10, the difference between the output of the primary bridge circuit and the output of the secondary bridge circuit is greater than that in cases of normal conditions (hereinafter also referred to as "normal difference"). For example, assume that a threshold of 0.05 (±5% of the normal difference) is set for the difference in a case where there is plastic deformation of the strain element 11.

In step S304, the CPU determines whether or not the foregoing absolute value of the ratio of the difference is more than the threshold 0.05 (i.e., whether or not the difference between the output of the primary bridge circuit and the output of the secondary bridge circuit is less than or greater than the normal difference by more than 5%).

If it is determined that the absolute value of the ratio of the difference is more than the threshold 0.05, the CPU compares the component F1 with its reference value, and compares the component F2 with its reference value (step S305). The reference values are the values of the components F1 and F2 under a specific condition, such as a condition in which the force-torque sensor 10 is in a specific attitude.

In step S306, the CPU finds the difference between the component F1 and its reference value, and finds the difference between the component F2 and its reference value. The CPU then determines whether the difference between the component F1 (or F2) and its reference value is equal to or greater than a predetermined threshold (for example, the CPU determines whether the difference between the component F1 (or F2) and its reference value is equal to or more than 5% of the reference value). If the difference between the component F1 (or F2) and its reference value is equal to or greater than the predetermined threshold, the CPU determines that there is an abnormality in the circuit corresponding to that component F1 or F2. For example, in a case where the difference between the component F1 and its reference value is greater than the threshold, the CPU determines that there is an abnormality in the primary bridge circuit.

In step S307, the CPU externally transmits a failure indication signal indicative of the presence of a bridge circuit that has been determined to have an abnormality.

According to the above-described process, whether or not there is a mechanical trouble in the force-torque sensor 10 is determined based on whether an unintentional change has occurred in the output value of at least either of the primary bridge circuit and the secondary bridge circuit. The result of determination "there is a mechanical trouble" is instantly presented to a user of the force-torque sensor 10. This further improves the reliability of the force-torque sensor 10.

Note that, in step S306, if both the component F1 and the component F2 are different from their reference values by equal to or more than 5%, the CPU determines that there are abnormalities in both the primary bridge circuit and the secondary bridge circuit. However, in such cases, the strain element may have some failure. Therefore, in step S307, the CPU may externally transmit a failure indication signal indicating that (i) there are abnormalities in both the primary bridge circuit and the secondary bridge circuit and/or (ii) the strain element has some failure.

[Example of Process of Switching Between Outputs]

Figure 6:
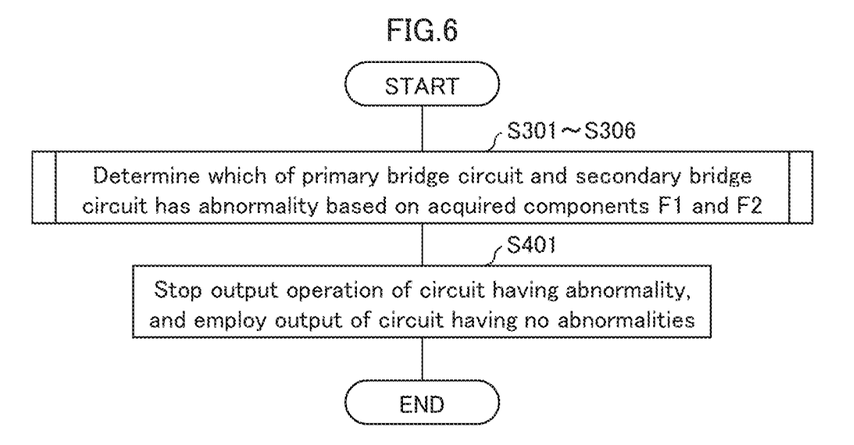
FIG. 6 is a flowchart showing an example of a flow of a process of switching between output signals, carried out by a force-torque sensor in accordance with an embodiment of the present invention.

The force-torque sensor 10 further includes a switch by which either of the following states is selected: a state in which a component detected by the primary bridge circuit is used as a specific directional component of a force outputted externally from the force-torque sensor 10; and a state in which a component detected by the secondary bridge circuit is used as the specific directional component of the force outputted externally from the force-torque sensor 10. FIG. 6 is a flowchart showing an example of a flow of a process of switching between output signals, carried out by a force-torque sensor 10 in accordance with an embodiment of the present invention. In this example, it is assumed that a component of a force detected by a primary bridge circuit is usually used as a component of a force outputted externally from the force-torque sensor 10.

In steps S301 to S306 of FIG. 5, the CPU determines, based on the acquired components F1 and F2, which of the primary bridge circuit and the secondary bridge circuit has an abnormality. If it is not determined that there is an abnormality, the CPU ends the process for switching between outputs.

If it is determined that there is an abnormality in a certain bridge circuit, the CPU stops the output operation of that certain bridge circuit, and acquires an output value from another bridge circuit which is other than the certain bridge circuit (step S401). For example, if it is determined that there is an abnormality in the primary bridge circuit, the CPU in step S401 stops the output operation of the primary bridge circuit and employs the output value of the secondary bridge circuit. As such, in this example, the CPU serves as a switch by which the output of the force-torque sensor 10 is switched from the output of a bridge circuit having an abnormality to the output of another bridge circuit having no abnormalities.

According to such a process, even if there is a mechanical trouble in the primary bridge circuit whose detected value is usually used for external output, the bridge circuit whose detected value is externally outputted can be switched from the primary bridge circuit to the secondary bridge circuit. This makes it possible to continue using the force-torque sensor 10 in an appropriate operating state. This makes it possible to continue using the force-torque sensor 10 even after the primary bridge circuit or the secondary bridge circuit is broken.

[Other Examples of Arrangement of Strain Gauges and Other Examples of Bridge Circuit]

Note that, in Embodiment 1, there are no limitations on the arrangement of strain gauges 22 and the configuration of each bridge circuit, provided that forces in desired directions can be detected. The bridge circuit only needs to be configured appropriately according to the arrangement of strain gauges. The arrangement of strain gauges 22 may be, for example, any of those illustrated in FIGS. 7 to 9.

Figure 7:
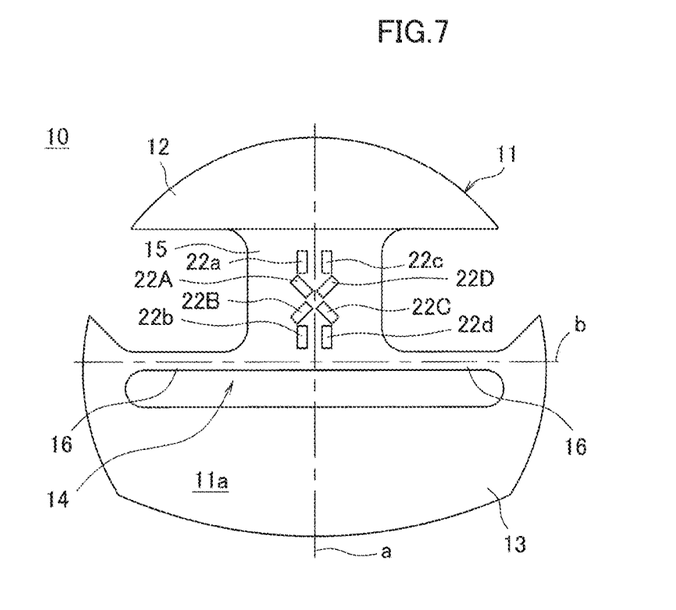
FIG. 7 schematically illustrates a second example arrangement of strain gauges on a first main face of a beam portion.
Figure 8:
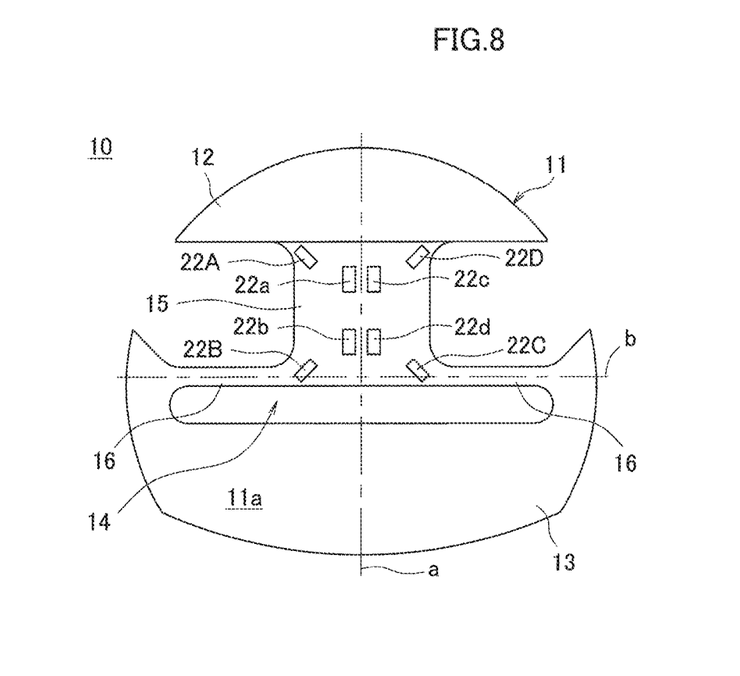
FIG. 8 schematically illustrates a third example arrangement of strain gauges on a first main face of a beam portion FIG. 9 schematically illustrates a fourth example arrangement of strain gauges on a first main face of a beam portion.
Figure 9:
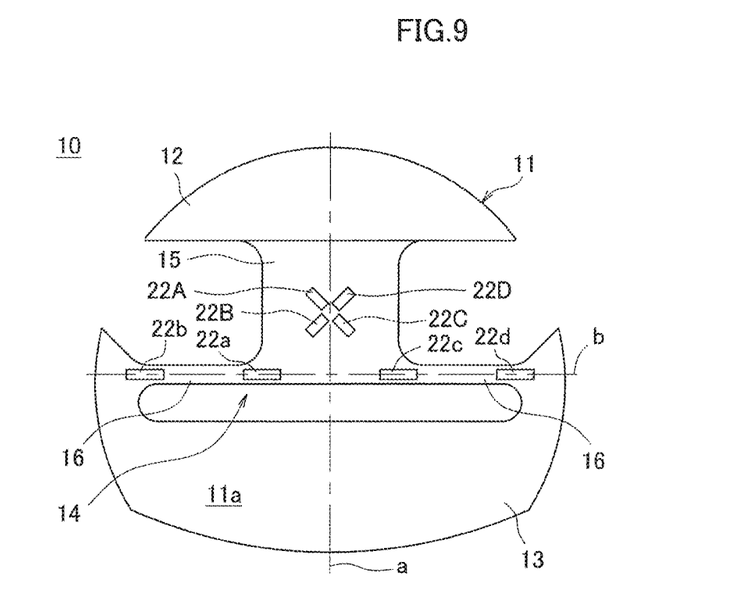

FIG. 7 schematically illustrates a second example arrangement of strain gauges on a first main face of a beam portion. FIG. 8 schematically illustrates a third example arrangement of strain gauges on a first main face of a beam portion. FIG. 9 schematically illustrates a fourth example arrangement of strain gauges on a first main face of a beam portion.

In the second example arrangement, a strain gauge 22*a* and a strain gauge 22*c* are arranged symmetrically to each other with respect to centerline a of a beam portion 14, and a strain gauge 22*b* and a strain gauge 22*d* are arranged symmetrically to each other with respect to the centerline a. The strain gauge 22*a* and the strain gauge 22*b* are arranged in parallel to the centerline a, and the strain gauge 22*c* and the strain gauge 22*d* are arranged in parallel to the centerline a.

There are strain gauges 22A, 22B, 22C, and 22D between the strain gauges 22*a* and 22*c* and the strain gauges 22*b* and 22*d* such that the strain gauges 22*a* and 22*c*, the strain gauges 22A, 22B, 22C, and 22D, and the strain gauges 22*b* and 22*d* are arranged in this order in a direction along the centerline a. The strain gauge 22A and the strain gauge 22D are arranged symmetrically to each other with respect to the centerline a, and the strain gauge 22B and the strain gauge 22C are arranged symmetrically to each other with respect to the centerline a. The strain gauges 22A and 22C are arranged on a first imaginary line that intersects the centerline a at an angle of 45°. The strain gauges 22B and 22D are arranged on a second imaginary line that intersects the centerline a at an angle of 45° and that is orthogonal to the first imaginary line.

In the third example arrangement, strain gauges 22*a*, 22*b*, 22*c*, and 22*d* are arranged in the same manner as those of the second example arrangement. Strain gauges 22A, 22B, 22C, and 22D are arranged on the first and second imaginary lines similarly to those of the second example arrangement, except that the strain gauges 22A, 22B, 22C, and 22D are further away from the centerline a than the respective strain gauges 22*a*, 22*b*, 22*c*, and 22*d* are. In the third example arrangement, the strain gauges 22A and 22D are positioned closer to the core portion 12 than the strain gauges 22*a* and 22*c* are, whereas the strain gauges 22B and 22C are positioned closer to the frame portion 13 than the strain gauges 22*b* and 22*d* are.

The fourth example arrangement is the same as the second example arrangement, except that strain gauges 22*a*, 22*b*, 22*c*, and 22*d* are arranged differently. The strain gauges 22*a*, 22*b*, 22*c*, and 22*d* are arranged on centerline b. The strain gauges 22*a* and 22*c* are positioned closer to the centerline a than the strain gauges 22*b* and 22*d* are. More specifically, the strain gauges 22*a* and 22*c* are disposed in a portion of an arm portion 15 where the arm portion 15 connects to a flexure 16, whereas the strain gauges 22*b* and 22*d* are each disposed in a portion of the flexure 16 where the flexure 16 connects to the frame portion 13.

In the second to fourth example arrangements described above, an FzMxMy bridge circuit and an FxFyMz bridge circuit are each comprised of a combination of strain gauges 22 assigned the same reference signs as those of the foregoing first example arrangement illustrated in FIGS. 3 and 4.

In Embodiment 1, the arrangement of strain gauges 22 and the configuration of each bridge circuit are the same between the first main face 11*a* and the second main face 11*b*. Note, however, that the arrangement of strain gauges 22 and the configuration of each bridge circuit may be different between the first main face 11*a* and the second main face 11*b*. In such cases, in the foregoing failure detection or the determination with regard to switching, an output value of a primary bridge circuit on the first main face 11*a* and an output value of a secondary bridge circuit on the second main face 11*b* may be compared in terms of forces.

In Embodiment 1, the foregoing first and second strain gauge groups are disposed on the first main face 11*a* of the strain element 11 and on the second main face 11*b* opposite the first main face 11*a*, respectively. Strain gauges and a bridge circuit can be attached at a time to a beam portion by (i) preparing a one-piece unit by connecting strain gauges to form a bridge circuit with a desired configuration (such a unit is referred to as "bridge forming gauge unit") and then (ii) bonding the unit to the beam portion. Employing such a bridge forming gauge unit is advantageous in order to improve reliability, because the occurrence of connection failure of strain gauges decreases. This is also advantageous in order to improve workability in the production of a force-torque sensor and thereby improve productivity.

Embodiment 2

The following description will discuss another embodiment of the present invention. For convenience of description, members having functions identical to those described in Embodiment 1 are assigned identical referential numerals, and their descriptions are omitted here.

Figure 10:
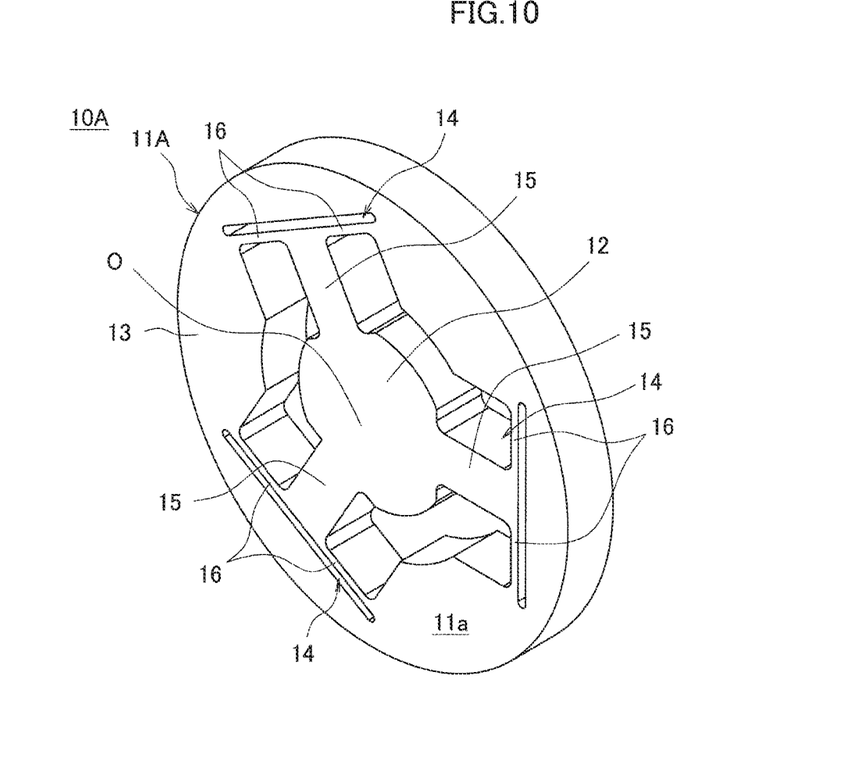
FIG. 10 is a perspective view schematically illustrating a strain element of a force-torque sensor in accordance with another embodiment of the present invention.

Embodiment 2 discusses a force-torque sensor that includes a strain element comprised of three beam portions arranged in the form of a letter Y in plan view. Embodiment 2 is substantially the same as the foregoing Embodiment 1, except for the shape of the strain element. FIG. 10 is a perspective view schematically illustrating a strain element of a force-torque sensor in accordance with Embodiment 2 of the present invention.

In a force-torque sensor 10A in accordance with Embodiment 2, a core portion 12 in Embodiment 2 is in the shape of a prism with a substantially hexagonal base (i.e., substantially in the shape of a hexagonal prism). A frame portion 13 in Embodiment 2 is in the shape of a tube with a substantially circular base having a substantially hexagonal opening.

A strain element 11A includes beam portions 14. The number of beam portions 14 in Embodiment 2 is three. The three beam portions 14 are arranged so as to from a letter Y shape when seen in plan view. The beam portions 14 are arranged along a circumferential direction of the core portion 12 and the frame portion 13 so as to be equally spaced apart from each other (spaced apart from each other by 120° around center O). The core portion 12 in plan view is in the shape of, for example, a circle. Each of the beam portions 14 has, at each of first and second main faces 11a and 11b, strain gauges 22 arranged in the same manner as those of Embodiment 1 and bridge circuits formed in the same manner as those of Embodiment 1.

In Embodiment 2, each of the components Fz, Mx, and My is detected based on a combination of output signals from three FzMxMy bridge circuits disposed on first main faces (which are part of the first main face 11a) of the beam portions 14. Each of the components Fx, Fy, and Mz is detected based on a combination of output signals from three FxFyMz bridge circuits disposed on the first main faces (which are part of the first main faces 11a) of the beam portions 14. Also, each of the components Fz, Mx, and My is detected based on a combination of output signals from three FzMxMy bridge circuits disposed on second main faces (which are part of the second main face 11b) of the beam portions 14. Furthermore, each of the components Fx, Fy, and Mz is detected based on a combination of output signals from three FxFyMz bridge circuits disposed on the second main faces (which are part of the second main face 11b) of the beam portions 14.

In Embodiment 2, failure detection and/or determination with regard to switching are/is carried out in the same manner as described in Embodiment 1. Embodiment 2 provides the same effects as those of Embodiment 1.

[Software Implementation Example]

In the foregoing embodiments, control blocks for determining whether or not there is plastic deformation or for carrying out determination with regard to switching between output signals can be realized by a logic circuit (hardware) provided in an integrated circuit (IC chip) or the like or can be alternatively realized by software.

In the latter case, the feature for carrying out the determination includes a computer that executes instructions of a program that is software realizing the foregoing functions. The computer, for example, includes at least one processor and a computer-readable storage medium storing the program. An objective, i.e., carrying out the determination, can be achieved by the processor of the computer reading and executing the program stored in the storage medium.

Examples of the processor encompass the foregoing CPU. Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows.

A force sensor in accordance with Aspect 1 of the present invention is a force sensor for detecting a component, in a specific direction, of a force exerted on a strain element, the force sensor including: a primary bridge circuit that includes a first strain gauge group disposed on a first face of the strain element and that is configured to detect a component, in the specific direction, of a force exerted on the strain element; and a secondary bridge circuit that includes a second strain gauge group disposed on a second face of the strain element and that is configured to detect a component, in the same direction as the specific direction, of the force exerted on the strain element, the second face being opposite the first face.

According to the force sensor arranged as described above, a specific directional component of a force can be detected at each of the first and second faces independently, with use of a plurality of bridge circuits. This makes it possible to improve the reliability of the force sensor in terms of mechanical troubles.

In Aspect 2 of the present invention, a force sensor may be arranged such that, in Aspect 1, the force sensor further includes a circuit or a processor configured to determine whether or not there is a mechanical trouble in the force sensor by comparing a component detected by the primary bridge circuit and a component detected by the secondary bridge circuit.

The above arrangement makes it possible to detect various mechanical troubles in the force sensor, and therefore is more effective in improving the reliability of the force sensor.

In Aspect 3 of the present invention, a force sensor may be arranged such that, in Aspect 1 or 2, the force sensor further includes a switch by which either of a first state and a second state is selected, the first state being a state in which a component detected by the primary bridge circuit is used as the component in the specific direction outputted externally from the force sensor, the second state being a state in which a component detected by the secondary bridge circuit is used as the component in the specific direction outputted externally from the force sensor.

According to the above arrangement, a bridge circuit, whose detected component of a force is used as the component of the force outputted externally from the force sensor, can be switched from a faulty circuit to a circuit in its normal state. This makes it possible to continue using the force sensor even after at least one bridge circuit is broken.

In Aspect 4 of the present invention, a force sensor may be arranged such that, in any of Aspects 1 to 3, the force sensor includes: a first bridge circuit group configured to detect a force component Fz in a direction along a z axis, a moment component Mx about an x axis, and a moment component My about a y axis; and a second bridge circuit group configured to detect a force component Fx in a direction along the x axis, a force component Fy in a direction along the y axis, and a moment component Mz about the z axis, the x axis, the y axis, and the z axis being three orthogonal axes, the primary bridge circuit being a bridge circuit belonging to the first bridge circuit group or the second bridge circuit group.

The above arrangement makes it possible to detect components of a force in the six-axis directions.

In Aspect 5 of the present invention, a force sensor may be arranged such that, in any of Aspects 1 to 4: the first face is a first main face of the strain element; and the second face is a second main face of the strain element, the second main face being opposite the first main face.

According to the above arrangement, strain gauges and the like can be attached to the main face of the strain element by preparing a one-piece unit including the strain gauges arranged at desired positions and then bonding the unit to the main face of the strain element. This is therefore more effective in improving productivity and in reducing connection failure of traces or wires.

In Aspect 6 of the present invention, a force sensor may be arranged such that, in any of Aspects 1 to 5, the strain element includes: a core portion configured to receive a force; a frame portion fixed to the core portion; an arm portion that connects the core portion and the frame portion; and a flexure that resides between the frame portion and the arm portion.

The above arrangement makes it possible to detect components of a force more accurately than strain elements with no flexures.

[Variations]

The present invention is not limited to the embodiments, but can be altered by a skilled person in the art within the scope of the claims. The present invention also encompasses, in its technical scope, any embodiment derived by combining technical means disclosed in differing embodiments.

For example, Embodiments 1 and 2 discuss cases in which the present invention is employed in a six-axis force-torque sensor. The force sensor in accordance with the present invention is not limited to the six-axis force-torque sensor, and can alternatively be a force sensor for detecting (measuring) a component having at least one of the magnitude and the direction of a force received by an object. Such a force sensor, if it detects inertial forces, is also called a motion sensor such as an acceleration sensor or an angular velocity sensor.

The strain element only needs to have a structure that is sufficient to achieve a desired purpose of the force-torque sensor. For example, arms or flexures are not essential in the strain element.

There is no limitation on the outer shape of the strain element, as well. The outer shape of the strain element may be a shape other than a circle, for example, may be a quadrangle or a polygon.

Embodiments 1 and 2 discuss arrangements in which the central portion of a strain element is used as a core portion whereas a rim portion that extends around the core portion is used as a frame portion. The force-torque sensor in accordance with one or more embodiments of the present invention can alternatively be configured such that the rim portion is used as a core portion and the central portion is used as a frame portion.

In Embodiments 1 and 2, a six-axis force-torque sensor is configured such that the directions of components of a force detected by primary bridge circuits are substantially the same as the directions of components of a force detected by secondary bridge circuits. Note, however, that the present invention is not limited as such. For example, in a case where the primary bridge circuits are configured to detect the foregoing six direction components of a stress in the strain element, the secondary bridge circuits may be configured to detect three of these six direction components. Such an arrangement is advantageous in order to reduce information processing load on the force-torque sensor.

Furthermore, for example, a primary bridge circuit and a secondary bridge circuit may be different from each other in terms of a manner in which strain gauges are arranged and in terms of a configuration of the bridge circuit (i.e., which combination of strain gauges is included in the bridge circuit). More specifically, each secondary bridge circuit may belong to a bridge circuit group that is constituted by bridge circuits other than the FzMxMy bridge circuits and FxFyMz bridge circuits. In this case, the strain gauges of that secondary bridge circuit are also disposed on the second face based on the configuration of the bridge circuit group to which the secondary bridge circuit belongs.

In Embodiments 1 and 2, the strain gauges of the first strain gauge group are disposed on the first main face, whereas the strain gauges of the second strain gauge group are disposed on the second main face. Note, however, that the arrangement of strain gauges is not limited as such. For example, a strain gauge(s) of the first strain gauge group may be disposed on one of opposite side faces of a beam portion 14, whereas a strain gauge(s) of the second strain gauge group may be disposed on the other of the opposite side faces of the beam portion 14.

REFERENCE SIGNS LIST 10, 10A force-torque sensor
11 strain element
11a first main face
11b second main face
12 core portion
13 frame portion
14 beam portion
15 arm portion
16 flexure
22 strain gauge

The invention claimed is:

1. A force sensor for detecting a component, in a specific direction, of a force exerted on a strain element, the force sensor comprising:
a primary bridge circuit that includes a first strain gauge group disposed on a first face of the strain element and that is configured to detect a component, in the specific direction, of a force exerted on the strain element; and
a secondary bridge circuit that includes a second strain gauge group disposed on a second face of the strain element and that is configured to detect a component, in the same direction as the specific direction, of the force exerted on the strain element,
the second face being opposite the first face.

2. The force sensor according to claim 1, further comprising a circuit or a processor,
    the circuit or the processor being configured to determine whether or not there is a mechanical trouble in the force sensor by comparing a component detected by the primary bridge circuit and a component detected by the secondary bridge circuit.

3. The force sensor according to claim 1, further comprising a switch by which either of a first state and a second state is selected,
    the first state being a state in which a component detected by the primary bridge circuit is used as the component in the specific direction outputted externally from the force sensor,
    the second state being a state in which a component detected by the secondary bridge circuit is used as the component in the specific direction outputted externally from the force sensor.

4. The force sensor according to claim 1, comprising:
    a first bridge circuit group configured to detect a force component Fz in a direction along a z axis, a moment component Mx about an x axis, and a moment component My about a y axis; and
    a second bridge circuit group configured to detect a force component Fx in a direction along the x axis, a force component Fy in a direction along the y axis, and a moment component Mz about the z axis,
    the x axis, the y axis, and the z axis being three orthogonal axes,
    the primary bridge circuit being a bridge circuit belonging to the first bridge circuit group or the second bridge circuit group.

5. The force sensor according to claim 1, wherein:
    the first face is a first main face of the strain element; and
    the second face is a second main face of the strain element, the second main face being opposite the first main face.

6. The force sensor according to claim 1, wherein the strain element includes:
    a core portion configured to receive a force;
    a frame portion fixed to the core portion;
    an arm portion that connects the core portion and the frame portion; and
    a flexure that resides between the frame portion and the arm portion.

7. The force sensor according to claim 1, wherein the strain element includes a plurality of beam portions.

* * * * *